April 30, 1968   L. DOYEN ET AL   3,380,646
CONTAINER OF PLASTIC MATERIAL AND METHOD OF PRODUCING SAME
Filed Nov. 12, 1963   3 Sheets-Sheet 1

Léon Doyen
Louis Doyen
INVENTORS.

BY

Karl F. Ross
Attorney

April 30, 1968     L. DOYEN ET AL     3,380,646
CONTAINER OF PLASTIC MATERIAL AND METHOD OF PRODUCING SAME
Filed Nov. 12, 1963     3 Sheets-Sheet 2
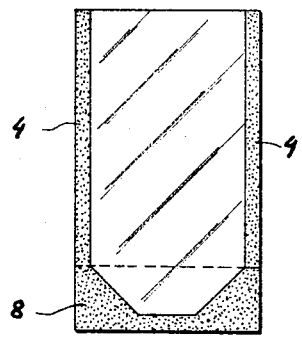
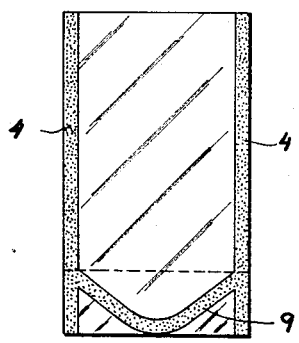
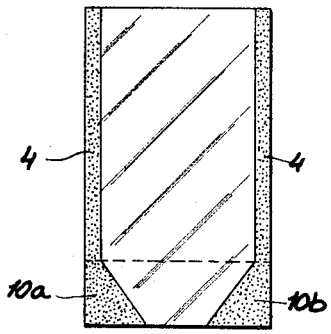
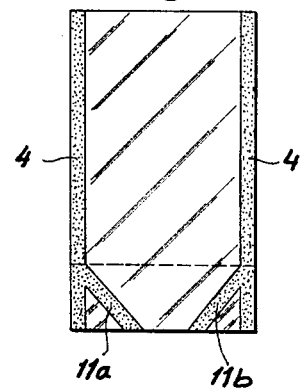
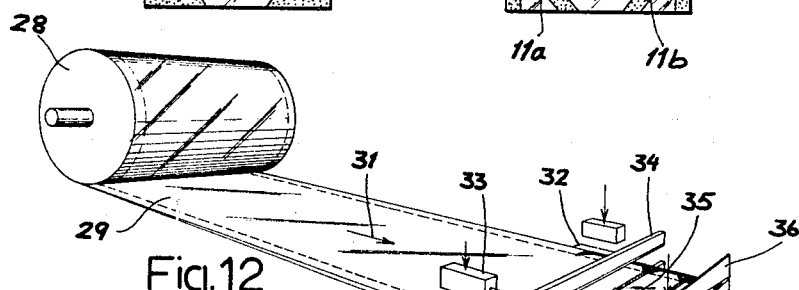
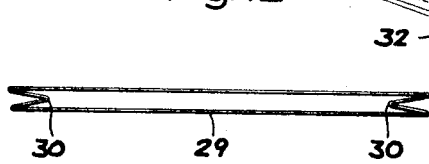
Leon Doyen
Louis Doyen
INVENTORS.
BY Karl J. Ross
Attorney April 30, 1968   L. DOYEN ET AL   3,380,646
CONTAINER OF PLASTIC MATERIAL AND METHOD OF PRODUCING SAME
Filed Nov. 12, 1963   3 Sheets-Sheet 3
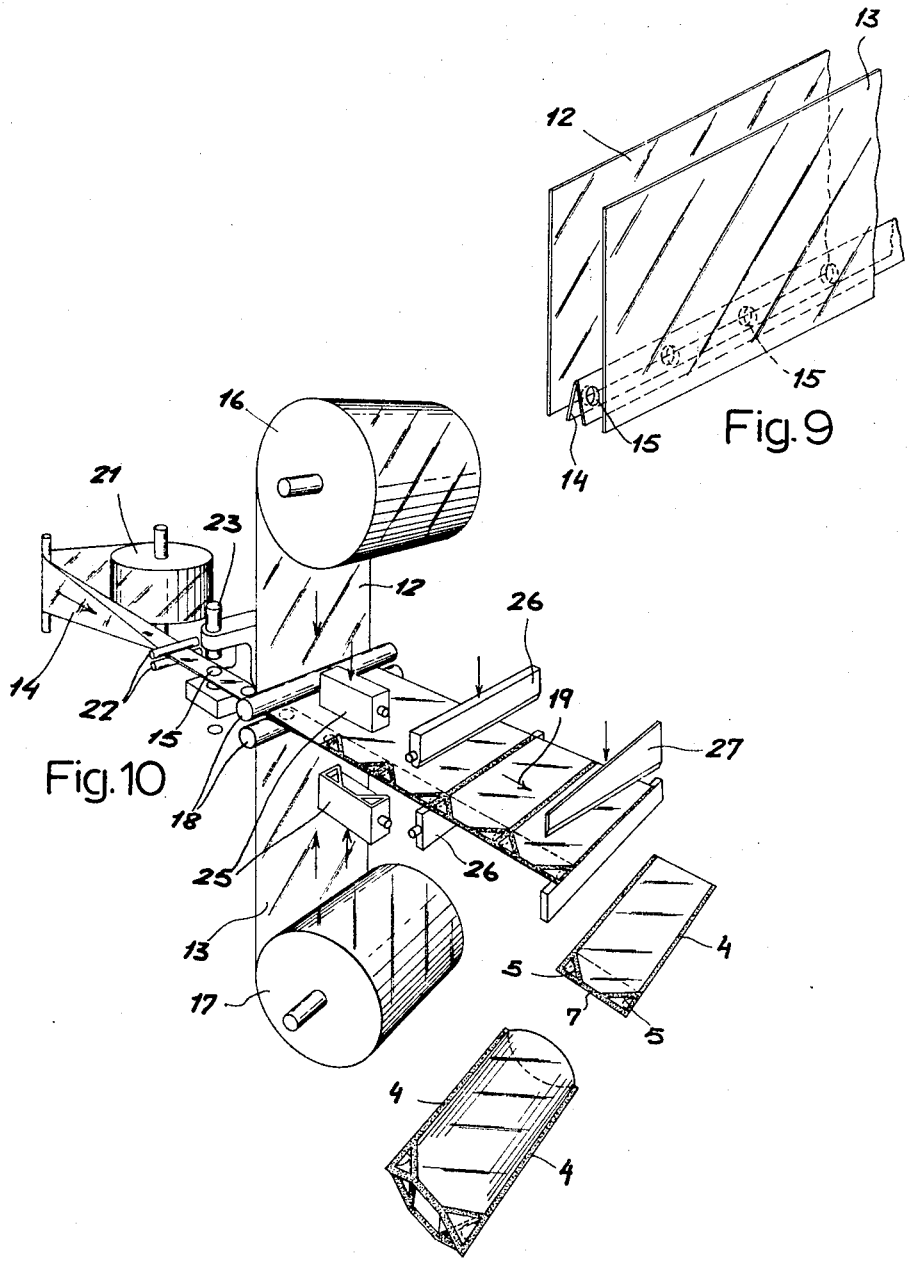
Leon Doyen
Louis Doyen
INVENTORS.
BY Karl F. Ross
Attorney

3,380,646
CONTAINER OF PLASTIC MATERIAL AND METHOD OF PRODUCING SAME
Léon Doyen and Louis Doyen, both of 79 Rue de Bourgogne, Lyon, France
Filed Nov. 12, 1963, Ser. No. 322,887
Claims priority, application France, Nov. 14, 1962, 43,047
6 Claims. (Cl. 229—57)

The present invention relates to a container of plastic material, of the type produced by welding and severing sheets or tubes of plastic material at spaced locations, and a method for making same.

As a consequence of the manufacturing method of the invention, the resulting container offers essentially the following advantages:

It withstands high pressures and violent shocks without danger of breaking; and

It has a unique shape which enables it to stand upright.

The container of the invention is constituted by two faces and a bottom part which forms an extension of said faces, the bottom part being folded in so as to form with said faces a W-section; two lateral welds extend throughout the height of said faces, including said bottom part, and oblique welds or else a curvilinear weld, the starting points of which are situated at the lateral welds close to the fold of said bottom part, join each face with the confronting bottom area.

Owing to this construction and the oblique welds, the container, when filled for instance with a liquid, exhibits a flat base in the shape of a hexagon or a rhombus, two opposite apices of which are formed by the lower ends of the two lateral welds which form two relatively rigid uprights, while its bottom part forms one or two dihedrons the farthest sides of which are triangular and depend from the above-mentioned uprights with respect to which they are inclined. The result of this construction is that the thrust exerted by the liquid on the bottom part, even in the case of a shock, is evenly distributed and the container possesses high strength.

The manufacture of the container of the invention is carried out by welding and spacedly severing one or more strips of plastic material of which at least one longitudinal edge is folded in so as to define the W-section intended to form the bottom part of the container, the axis of which is perpendicular to that of the strip or strips.

According to one embodiment of the method for manufacturing the container of this invention, the starting plastic material consists of a single sheet of which the median longitudinal portion is folded in so as to form a W-section; on said sheet are executed the transverse welds laterally defining the container and joining together the four faces of said W-section, and also curvilinear or oblique welds which extend only into the area folded as a W to unite the outer faces of said W with the inner faces thereof, so that the four faces are not joined to each other by these last-mentioned welds.

According to a modification of the method just described, a flattened tube of plastic material is used, the longitudinal edges of which are folded in so as to form each a W-section in order that the same welding operations allow simultaneously producing two containers which are subsequently severed from each other by a median lengthwise cutting of said tube.

According to a further modification, three superposed sheets are used, the intermediate sheet being narrower and doubled up so as to form a V section; said three sheets are joined together by the welds which define the sides and the bottom part of the container.

The various welds may be executed either separately or simultaneously, and the separation of the containers is effected by cutting between or on the transverse welds.

Precautions should be taken, however, for ensuring that the transverse welds and the curvilinear or oblique welds form the bottom part of the container according to the pattern described hereinabove.

To this end, according to a feature of the invention, the sheet of plastic material is a composite sheet constituted by at least two layers of different plastic materials such that one of said materials is thermally weldable while the other is not, and openings are provided in the sheet on both sides of the median longitudinal line thereof at intervals equal to the width of the container, so that the transverse welds passing through said openings join together the two outer faces while the curvilinear or oblique welds passing outside said openings only unite each outer face to the opposite inner face.

According to a more specific aspect of the method just described, the sheet of plastic material is of any type whatever, composite or not, but thermally weldable on both its faces, and an anti-adhesive screen is inserted into the inner fold of the W section, at the time the curvilinear or oblique welds are executed, in order that the latter only join together each outer face to the corresponding inner face, said screen being removed for executing the transverse welds which close the container laterally and join together the four faces or plies of the W section.

The appended diagrammatic drawing illustrates some embodiments of the container of the invention and two types of apparatus for manufacturing same. In said drawing:

FIGURES 4, 5, 6 and 7 are schematic front elevations of same, illustrating various welding techniques according to the invention;

FIGURE 9 is a perspective view illustrating the sheets used for manufacturing the container according to one embodiment of the invention;

FIGURE 10 is a perspective view of the various members of an apparatus for carrying out the method used for the sheets of FIG. 9, and illustrates the containers of the invention as their manufacture proceeds;

FIGURE 11 is a cross-section of a tube of plastic material used for manufacturing the containers according to a modified method; and FIGURE 12 is a perspective view of the members of an apparatus for manufacturing the container with the tube of FIG. 11.

Figure 8:
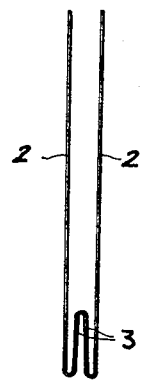
FIGURE 8 is a diagrammatic vertical section of the containers in the preceding figures.

The container of this invention is essentially constituted, as diagrammatically illustrated in FIGURE 8, by two faces 2 and a bottom part 3 which is united to said faces and folded in so as to form with the latter a W section. The connection of said faces 2 with the bottom part 3 for producing the container is effected by means of two lateral welds 4 which extend throughout the height of the faces 2, including the bottom part 3, and by means of two oblique welds 5 which extend only in the area of the W section formed by the faces 2 and the bottom part 3; each of the oblique welds 5 has its starting point 6 located on the corresponding lateral weld 4 close to the fold which is formed by the bottom part 3. This arrangement enables the container to withstand high pressures and violent shocks without any risk of breaking, the thrust from the contents being evenly distributed on the bottom part of the container at all times.

Apart from the lateral and oblique welds 4 and 5, respectively, other welds may be provided, for instance a horizontal weld 7 which extends across the whole base of the container and to which the oblique welds 5 are connected. Said horizontal weld 7 is executed at the same time as said oblique welds 5 and by means of the same electrodes.

Another essential feature of the invention which should be noted is the fact that the lateral welds 4 unite the two faces 2 of the container up to and including the area formed by the bottom part 3, whereby in this area four faces or plies, that is, the two outer faces and the two inner ones, are joined together by the same weld. On the contrary, the oblique welds 5, which are provided only in the bottom area 3, unite only two plies of said bottom, i.e., one outer face to the corresponding inner face. This is also the case for the horizontal weld 7 when it is present.

FIGURES 1–7 illustrate various embodiments of said oblique or curvilinear welds in the bottom area 3. As regards the container shown in FIGURES 1–3, there are two oblique welds 5 and one horizontal weld 7; in the container illustrated in FIG. 4, a single weld 8 is executed, of which the lower edge is horizontal while the upper edge is a broken line; in the case of FIG. 5, only one curvilinear weld 9 is executed; in FIG. 6, two welds 10a, 10b are executed, the lower edges of which are horizontal while their upper edges are oblique; and in the case of FIG. 7 two oblique welds 11a, 11b are executed.

Figure 1:
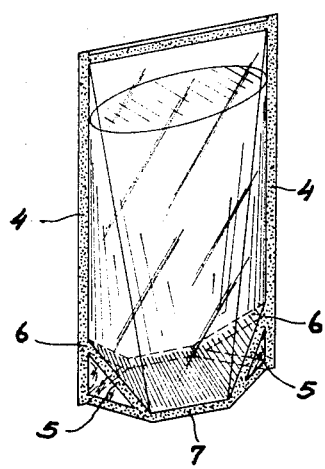
FIGURES 1, 2 and 3 are respectively a perspective view, a front elevation and a vertical half-section of the container of the invention filled and closed.
Figure 3:
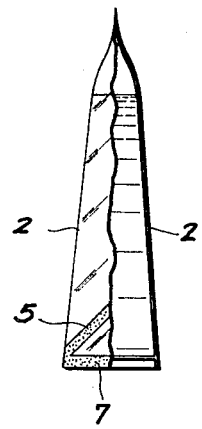
Figure 2:
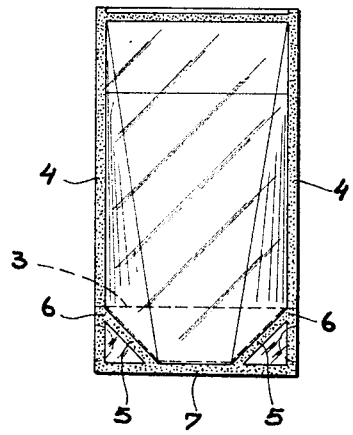

By way of examples, we will now describe two methods for producing containers having the configurations of those illustrated in FIGS. 1–3.

The first of said methods will be explained with reference to FIGS. 9 and 10. As shown in FIG. 9, the containers are produced at the start from three strips of plastic material 12, 13, 14 respectively. The two strips 12 and 13 have the same width and are superposed. The strip 14, which may be possibly of a different nature and thicker than the two other strips, is much narrower and doubled up so as to form a V section of which the two edges are juxtaposed with two of the longitudinal edges of the strips 12 and 13. Said strips 12, 13 and 14 may be made of any plastic material either unitary or composite. In the case where said material is of a composite type, that is, consists of two layers of plastic material of different character such that one of them is thermally weldable while the other is not, it is necessary to provide means for enabling the lateral welds 4 to join together the two strips 12 and 13 throughout their width, including the area where the intermediate doubled up strip 14 lies. To this end, openings 15 are provided in register in both faces of said strip 14 on both sides of the line along which the latter is folded, the distance between the centers of said openings being equal to the width of the container to be obtained, and the strips 12 and 13 are disposed in a manner such that their thermally weldable faces confront each other. The result is that:

The welds executed perpendicularly to the axis of the strips 12, 13, 14 and passing through the openings 15 will join together the strips 12, 13 throughout the width thereof and the doubled up strip 14, said welds being those 4 which will define the container laterally;

The welds executed on the strips 12, 13 in the area thereof including the strip 14 will only unite the strip 12 to one of the faces of the strip 14 and the strip 13 to the other face of said strip 14 as a result of the composite character of said strips 12, 13; the welds 5, 7 will define the bottom part of the container and suspend said bottom part from the lateral welds 4.

With reference to FIGURE 10, 16 and 17 indicate the two reels which deliver the strips 12 and 13 respectively, which pass through bar means 18 which enable said strips to travel then one over the other in the direction of the arrow 19 through the agency of a pulling systems (not shown).

21 indicates another reel of which the axis is vertical, that is, perpendicular to the axes of the reels 16 and 17. Said reel 21 delivers the narrow strip 14 which passes through bar means 22 which make it possible for said strip to double itself up so as to form a V section, after which said strip 14 passes through the bar means 18 between the two corresponding longitudinal edges of the strips 12 and 13.

Within the portion lying between the two bar means 18 and 22 a punching device 23 is disposed, the operation of which is related to the travel of the strips 12, 13 and 14. Said device 23 punches the holes 15 in folded strip 14, the distance between the centers of the holes being equal to the width of the container to be produced.

Two complementary electrodes 25 are disposed downstream with respect to the bar means 18 and are adapted to move in a direction perpendicular to the travel of the strips 12, 13, 14. The electrodes 25 have dimensions and their operating rhythm is such that they form the oblique welds 5 and the horizontal welds 7 in the area where the strips 12, 13 and 14 are superposed, whereby the bottom part of the container is completed.

Downstream with respect to the electrodes 25 is another pair of electrodes 26 which are intended to execute the transverse lateral welds 4 passing through the openings 15 in the strip 14. After passing between said electrodes 26, the strips 12, 13, 14 define thus several containers which are severed from each other by a knife or cutter 27.

The arrangement described hereinabove makes it possible to manufacture the container of the invention in the case where a composite plastic material is used. When using a non-composite plastic material, or even a composite material of which both faces are thermally weldable, said arrangement is not suitable as the oblique welds 5 and the horizontal weld 7 would join together the four plies formed by the strips 12, 13, 14, which would prevent the formation of the bottom part of the container.

FIGURE 12 illustrates, by way of example, an apparatus for manufacturing the container of the invention from non-composite material. At the start, said material may be in the form of superposed strips, or a folded sheet or a folded in tube.

FIGURES 11 and 12 illustrate the latter instance. 28 indicates a reel delivering a flattened tube of plastic material 29 of which both edges are folded in in a manner such that each said edge forms a W section as shown at 30. On the path of the tube 29, in the direction of the arrow 31, two anti-adhesive screens 32 are disposed, the length of which is greater than the width of one container, said screens being disposed opposite each other inside the lateral folds 30 of the tube 29. On either side of each of said screens 32 two electrodes 33 are located and are adapted to move within a plane perpendicular to the direction of the travel of the tube 29. When the electrodes 33 close and squeeze the edges of said tube 29, they form the oblique welds 5 and the longitudinal weld 7 and, owing to the presence of shields or screens 32, these welds 5, 7 unite only one of the faces of the tube 29 to the corresponding inner face of the fold 30, although both faces of said tube are made of thermo-weldable material.

Two other electrodes 34 are located downstream or forwardly of the electrodes 33 and form the lateral welds 4 on each container; downstream of the electrodes 34 are located a blade 35 which cuts the tube along the median longitudinal line thereof, and a cutting device 36 which severs the containers from one another.

The latter apparatus allows the production, with very simple means, of containers identical with those obtained by means of the apparatus shown in FIGURE 10. Furthermore, it has the advantage of an output at least twice as great, since two containers are produced in the width of the tube 29.

Obviously the method of manufacturing the container of the invention is not limited solely to the two embodiments of apparatus described hereinabove; on the contrary, it covers all the modifications thereof coming within the scope of the invention. Namely, openings corresponding to those 15 in FIGURES 9, 10, may be provided in the case where a non-composite plastic material should be used with the apparatus illustrated in FIGURE 12; again, an anti-adhesive screen such as that 32 in FIGURE 12 may be used when using a composite plastic material with the apparatus illustrated in FIGURE 10.

What we claim is:

1. A method of making a container from flexible fusible sheet material, comprising the steps of juxtaposing a pair of main panels with a pair of interconnected bottom panels of inverted-V cross-section between said main panels at an end thereof, thermally welding said main panels and said bottom panels together along a pair of parallel spaced apart first seams on opposite sides of said bottom panels; thermally welding each of said bottom panels individually to a confronting one of said main panels at a pair of seams extending from intermediate locations along each of said first seams onwardly toward said end, said first seams extending to said end of said main panels; inserting a strip of flexible sheet material of inverted-V cross-section between said main panels to constitute said bottom panels from said strip, said strip having a pair of edges of said bottom panels registering with the corresponding edges of said main panels; and individually thermally bonding the registering edges of said bottom panels and the corresponding main panels together.

2. A method as defined in claim 1 wherein the registering pairs of edges are individually welded together by interposing between said pairs an element resistant to thermal adhesion with said sheet material and applying heat along the registering edges on opposite sides of the element.

3. A method as defined in claim 1 wherein said strip is provided with openings at locations spaced apart by a distance equal substantially to the distance between said first seams, said first seams extending through said openings.

4. A generally flat self-supporting pouch type container comprising a pair of opposite flat side walls of bendable yet relatively stiff material, a gusset construction along one margin of said container interposed and normally folded inwardly between said side walls, said side walls along other margins of said container being sealed to each other in face-to-face relationship closely adjacent said other margins to provide such pouch with flat fin-type seams and with a product-containing area extending substantially the full extent of said side walls between said other margins; said gusset construction comprising a flexible gusset panel secured to marginal portions of said side walls and being folded inwardly therebetween, said flexible gusset panel being joined with said side-wall marginal portions along non-straight seal lines removed from said one margin which together define a non-rectangular stress-distributing generally elliptical unsealed area inwardly of said seal lines when said gusset is expanded.

5. A container as defined in claim 4 wherein said gusset panel is integral with said side walls.

6. A container as defined in claim 4 wherein said gusset panel is a folded strip inserted between said guide walls and heatsealed thereto.

References Cited

UNITED STATES PATENTS

| | | | |
|---|---|---|---|
| 2,721,023 | 6/1955 | Phipps | 229—62 |
| 2,899,347 | 8/1959 | Kindseth | 229—62 |
| 2,936,940 | 5/1960 | Berghgracht | 229—61 |
| D. 173,933 | 2/1955 | Cargill et al. | |
| 2,265,075 | 2/1941 | Knuetter. | |

FOREIGN PATENTS

| | | |
|---|---|---|
| 534,852 | 7/1955 | Belgium. |
| 320,289 | 10/1929 | Great Britain. |

OTHER REFERENCES

German printed application, 1,065,320, January 1958.

DAVID M. BOCKENEK, *Primary Examiner.*

GEORGE O. RALSTON, FRANKLIN T. GARRETT, JOSEPH R. LECLAIR, *Examiners.*